(12) United States Patent
Kumada et al.

(10) Patent No.: US 10,076,010 B2
(45) Date of Patent: Sep. 11, 2018

(54) LIGHTING DEVICE, AND LUMINAIRE

(71) Applicant: Panasonic Intellectual Property Management Co., Ltd., Osaka (JP)

(72) Inventors: Kazuhiro Kumada, Hyogo (JP); Shinichi Murakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/650,880

(22) Filed: Jul. 15, 2017

(65) Prior Publication Data

US 2018/0035507 A1 Feb. 1, 2018

(30) Foreign Application Priority Data

Jul. 26, 2016 (JP) .................. 2016-146697

(51) Int. Cl.
*H05B 37/02* (2006.01)
*H05B 33/08* (2006.01)
*G05F 1/10* (2006.01)

(52) U.S. Cl.
CPC ........... *H05B 33/0848* (2013.01); *G05F 1/10* (2013.01); *H05B 33/0818* (2013.01); *H05B 33/0845* (2013.01); *H05B 33/0866* (2013.01); *H05B 33/0884* (2013.01); *H05B 37/02* (2013.01)

(58) Field of Classification Search
CPC ........... H05B 33/0815; H05B 33/0839; H05B 33/0845; H05B 33/0851; H05B 33/0875
USPC ..................... 315/185 R, 297, 307
See application file for complete search history.

(56) References Cited

U.S. PATENT DOCUMENTS

| | | | | |
|---|---|---|---|---|
| 9,095,024 | B1* | 7/2015 | Zhang | H05B 33/0815 |
| 2008/0150449 | A1* | 6/2008 | Wang | H05B 33/0815 |
| | | | | 315/291 |
| 2008/0258641 | A1* | 10/2008 | Nakagawa | H05B 33/0818 |
| | | | | 315/246 |
| 2009/0224686 | A1* | 9/2009 | Kunimatsu | H05B 33/0809 |
| | | | | 315/291 |
| 2011/0018450 | A1* | 1/2011 | Hsu | H05B 33/0815 |
| | | | | 315/185 R |
| 2011/0157246 | A1* | 6/2011 | Jang | G09G 3/3406 |
| | | | | 345/690 |
| 2013/0187570 | A1* | 7/2013 | Oshima | H05B 33/0848 |
| | | | | 315/307 |

(Continued)

FOREIGN PATENT DOCUMENTS

JP 2016-100165 A 5/2016

*Primary Examiner* — Tung X Le
(74) *Attorney, Agent, or Firm* — Renner Otto Boisselle & Sklar, LLP

(57) ABSTRACT

A constant current is configured to control an FET to adjust a drain current so that a detection voltage is equal to a reference voltage. A reference setter is configured to set the reference voltage to a sum of a first voltage and a second voltage. The first voltage is equal to a voltage developing across the detection resistor while a current, which has a same magnitude as a current supplied to the light source so that a current dimming level of the light source is equal to the dimming instruction value, flows through the detection resistor. The second voltage is equal to a voltage developing across the detection resistor while a second current, which has a same magnitude as a current flowing through the limiting resistor while the light source is on, flows through the detection resistor.

20 Claims, 8 Drawing Sheets

(56) References Cited

U.S. PATENT DOCUMENTS

| | | | |
|---|---|---|---|
| 2014/0091723 A1* | 4/2014 | Kuo | H05B 33/0818 |
| | | | 315/200 R |
| 2014/0139131 A1* | 5/2014 | Park | H05B 33/0818 |
| | | | 315/210 |
| 2015/0312984 A1* | 10/2015 | Kim | H05B 33/083 |
| | | | 315/186 |
| 2017/0181236 A1* | 6/2017 | Lee | H05B 33/0815 |
| 2017/0238385 A1* | 8/2017 | Sasaki | H05B 33/0845 |
| | | | 349/61 |

* cited by examiner

LIGHTING DEVICE, AND LUMINAIRE

CROSS-REFERENCE TO RELATED APPLICATION

The present application is based upon and claims the benefit of priority of Japanese Patent Application No. 2016-146697, filed on Jul. 26, 2016, the entire contents of which are incorporated herein by reference.

TECHNICAL FIELD

The present disclosure relates to lighting devices and luminaires.

BACKGROUND ART

Conventionally, there has been known a lighting device configured to supply Direct Current (DC) power to a light source. The lighting device includes a DC power supply configured to convert an Alternating Current (AC) voltage into a DC voltage in response to input of an AC power. The light source includes a series circuit of solid-state light emitting elements such as light emitting diodes (LED).

For example, Document 1 (JP 2016-100165A) discloses a lighting device (hereinafter, referred to as a conventional device) that is configured such that a light source, a Metal Oxide Semiconductor Field Effect Transistor (MOSFET), and a detection resistor are to be connected in series between output terminals of a DC power supply. This conventional device is configured to control a drain current of the MOSFET by controlling a gate voltage of the MOSFET so that a voltage across the detection resistor (referred to as "terminal voltage") equals to a reference value, thereby controlling a current (referred to as "load current") flowing through the light source.

However, a conventional lighting device has a possibility that the light source is kept on (continues emitting light) due to an electric charge stored in a capacitor of the device even after an AC power supply and the MOSFET are turned off for turning off the light source. In view of this problem, the above conventional device includes two voltage divider resistors, where one of the two voltage divider resistors is configured to be connected in parallel to the light source, while the other of the two voltage divider resistors is connected in parallel to a series circuit of the MOSFET and the detection resistor. Also, the two voltage divider resistors have appropriate resistances, so that a voltage applied across the light source while the light source is controlled to be turned off is limited to be smaller than a forward voltage of the light source. With this configuration, the voltage applied across the light source is limited to be smaller than the forward voltage of the light source while the AC power source and the MOSFET are turned off for turning off the light source. It is accordingly possible to prevent the light source from continuing emitting light.

In the conventional device, however, a current flowing through the detection resistor in a period in which the lighting device controls the light source to turn on includes not only the load current that flows from the light source but also a current that flows from the one of the voltage divider resistors connected in parallel to the light source. That is, in the terminal voltage of the detection resistor, a voltage, which is caused by the current flowing from the one of the two voltage divider resistors connected in parallel to the light source, is superposed on a voltage caused by the load current. The terminal voltage of the detection resistor is therefore larger than the voltage caused by the load current alone, which may lead to poor accuracy of the current control.

SUMMARY

An object of the present disclosure is to provide a lighting device and a luminaire which can offer improved current control accuracy and can prevent a light source from emitting light when the light source is controlled to be off.

A lighting device according to an aspect of the present disclosure includes a power supply circuit, a constant current circuit, a reference setter, and a limiting resistor. The power supply circuit includes two output terminals and configured to output a DC voltage through the two output terminals to supply a DC power to a light source that includes at least one solid-state light emitting element. The constant current circuit includes a series circuit of a transistor and a detection resistor electrically connected so that the light source is to be connected in series with the series circuit between the two output terminals, and a current regulator configured to control the transistor to adjust a current flowing through the series circuit so that a voltage across the detection resistor is equal to a reference voltage. The reference setter is configured to adjust the reference voltage in accordance with a dimming instruction value corresponding to a desired dimming level of the light source indicated by a dimming signal. The limiting resistor is to be connected in parallel to the light source. The reference setter is configured to set the reference voltage to a sum of a first voltage and a second voltage. The first voltage is equal to a voltage developing across the detection resistor as a result of a first current flowing through the detection resistor, the first current having a same magnitude as a current supplied to the light source so that a current dimming level of the light source is equal to the dimming instruction value. The second voltage is equal to a voltage developing across the detection resistor as a result of a second current flowing through the detection resistor, the second current having a same magnitude as a current flowing from the limiting resistor to the transistor while the light source is on.

A luminaire according to an aspect of the present disclosure includes the lighting device; the light source, the light source including at least one solid-state light emitting element and supplied with the DC power from the lighting device; and a casing to which the light source is attached.

BRIEF DESCRIPTION OF THE DRAWINGS

The figures depict one or more implementations in accordance with the present teaching, by way of example only, not by way of limitation. In the figures, like reference numerals refer to the same or similar elements.

DETAILED DESCRIPTION

The present embodiment relates generally to lighting devices and luminaires. More particularly, the present embodiment relates to a lighting device and a luminaire configured to supply a DC power to a solid-state light emitting element(s).

The embodiment of the present disclosure is described with reference to the drawings.

Figure 1:
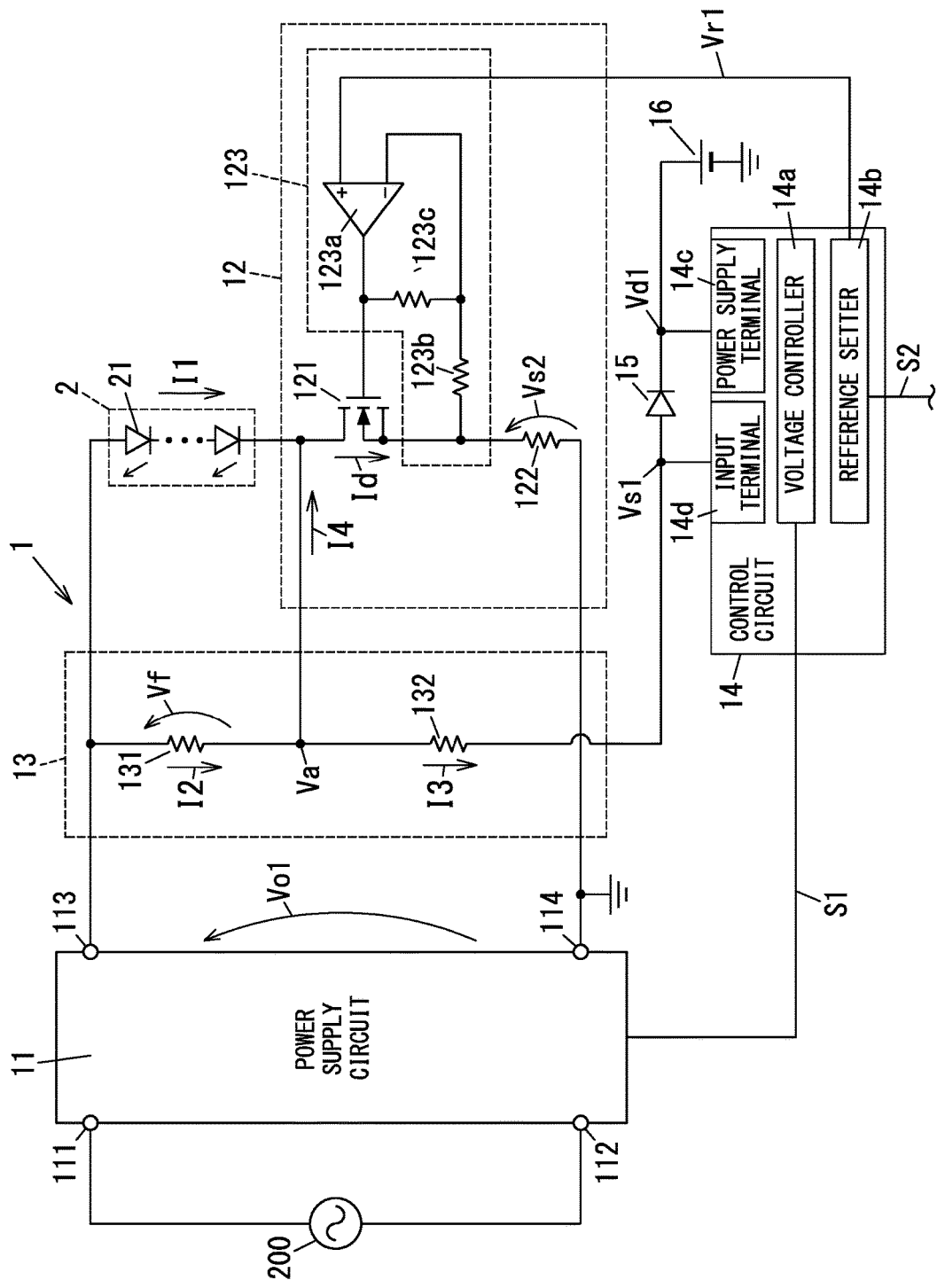
FIG. 1 is a block diagram of a lighting device according to an embodiment.

FIG. 1 is a circuit diagram of a lighting device 1 of the present embodiment.

The lighting device 1 includes a power supply circuit 11, a constant current circuit 12, a limiting circuit 13, and a control circuit 14. The lighting device 1 is configured to supply a lighting power to a light source 2.

The power supply circuit 11 includes two input terminals 111, 112 for receiving an AC power from a commercial power supply 200. The power supply circuit 11 is configured to convert the received AC power into a DC power to output the DC power through two output terminals 113, 114 thereof. A DC voltage Vo1 between (across) the output terminals 113 and 114 is adjusted to have a desired value in accordance with a feed-back control. The output terminal 113 serves as an output terminal (high potential side output terminal) of a high potential side for the DC voltage Vo1, whereas the output terminal 114 serves as an output terminal (low potential side output terminal) of a low potential side for the DC voltage Vo1.

The power supply circuit 11 may include any of a step-down chopper circuit, a step-up chopper circuit, and a step-up/step-down chopper circuit. Specific examples of the step-up/step-down chopper circuit employed in the power supply circuit 11 may preferably include a SEPIC circuit, a CUK circuit, and a ZETA circuit. Configurations and operations of the step-down chopper circuit, the step-up chopper circuit, the step-up/step-down chopper circuit, the SEPIC circuit, the CUK circuit, and the ZETA circuit are known and detailed explanation thereof are omitted.

The light source 2 and the constant current circuit 12 are connected in series between the output terminals 113, 114 of the power supply circuit 11.

The light source 2 includes a plurality of LEDs 21 connecting in series. The LED 21 is an example of a solid-state light emitting element. With regard to each adjacent two of the plurality of LEDs 21, a cathode of one LED 21 is electrically connected to an anode of the other LED 21. A high potential side terminal of the light source 2 is referred to as an anode terminal. A low potential side terminal of the light source 2 is referred to as a cathode terminal. In this case, the anode terminal of the light source 2 is electrically connected to the output terminal 113 of the power supply circuit 11. The cathode terminal of the light source 2 is electrically connected to the constant current circuit 12.

The constant current circuit 12 includes a FET (transistor) 121, a detection resistor 122, and a current regulator 123.

The FET 121 is an enhancement type N-channel MOS-FET. A drain of the FET 121 is electrically connected to the cathode terminal of the light source 2. A source of the FET 121 is electrically connected to a first end of the detection resistor 122. A second end of the detection resistor 122 is electrically connected to the output terminal 114 of the power supply circuit 11. In other words, a series circuit of the light source 2, the FET 121, and the detection resistor 122 is electrically connected between the output terminals 113, 114 of the power supply circuit 11.

The current regulator 123 includes an operational amplifier 123a, and resistors 123b, 123c. A first end of the resistor 123b is electrically connected to a source of the FET 121. A second end of the resistor 123b is electrically connected to an inverting input terminal of the operational amplifier 123a. In other words, a connection point of the source of the FET 121 and the detection resistor 122 is electrically connected to the inverting input terminal of the operational amplifier 123a through the resistor 123b. A non-inverting input terminal of the operational amplifier 123a is configured to receive a reference voltage Vr1 from the control circuit 14. The resistor 123c is electrically connected between an output terminal and the inverting input terminal of the operational amplifier 123a. The output terminal of the operational amplifier 123a is electrically connected to a gate of the FET 121. The current regulator 123 is configured to regulate a gate voltage of the FET 121, thereby adjusting a current flowing through a series circuit of the FET 121 and the detection resistor 122.

The limiting circuit 13 includes a first limiting resistor 131 and a second limiting resistor 132. The first limiting resistor 131 is electrically connected in parallel to the light source 2. A first end of the second limiting resistor 132 is electrically connected to a connection point of the first limiting resistor 131 and the FET 121 (connected to a drain of the FET 121). A second end of the second limiting resistor 132 is electrically connected to a positive electrode of a DC power supply 16 through a diode 15. The DC power supply 16 is configured to generate a control voltage Vd1. The control voltage Vd1 serves as an operating power of the control circuit 14. In the embodiment, the control voltage Vd1 is set to 5 [V]. However, the voltage value of the control voltage Vd1 is not limited to 5 [V], but may be set to a value appropriate for the control circuit 14.

The control circuit 14 includes a computer. The computer includes, as main components, a processing device (processor) for executing a program, an interface device (interface) for transmitting and receiving a signal to and from another device, and a storage device for storing the program, desired data, and the like. The processing device may be a Central Processing Unit (CPU) or a Micro Processing Unit (MPU) which may be a separate body from the storage device, or may be a Microcomputer which includes a storage device. Preferably, the storage device may have a fast access time, such as a semiconductor memory.

The program may be provided through a storage medium such as a computer readable Read Only Memory (ROM) or an optical disc that stores the program in advance, or may be provided to through a wide area communication network such as the Internet.

The control circuit 14 functions as a voltage controller 14a and a reference setter 14b by the computer executing appropriate programs, and controls operations of the power supply circuit 11 and the constant current circuit 12. The control circuit 14 may include discrete components for realizing the voltage controller 14a and the reference setter 14b.

The control circuit 14 includes a power supply terminal 14c, and the control voltage Vd1 is applied to the power supply terminal 14c. The power supply terminal 14c is electrically connected to the cathode of the diode 15. The anode of the diode 15 is electrically connected to the output terminal 113 of the power supply circuit 11 through the second limiting resistor 132 and the first limiting resistor 131. In other words, a first end of the first limiting resistor 131 is electrically connected to the high potential side output terminal 113, while a second end of the first limiting resistor 131 is electrically connected to the first end of the second limiting resistor 132. The second end of the second limiting resistor 132 is electrically connected to the anode of the diode 15, while the cathode of the diode 15 is electrically connected to the positive electrode of the DC power supply 16. A negative electrode of the DC power supply 16 is electrically connected to the output terminal 114 (through a ground). In other words, a series circuit of the first limiting resistor 131 and the second limiting resistor 132 is electrically connected between the output terminal 113 and the output terminal 114.

The voltage at the anode of the diode 15, referred to as a detection voltage Vs1, is supplied to an input terminal 14d of the control circuit 14. A value of the detection voltage Vs1 is clamped by the diode 15 to an upper limit voltage (clamped to a sum of the control voltage Vd1 and a forward voltage of the diode 15) and thereby overvoltage protection is realized.

The voltage controller 14a is configured to output, to the power supply circuit 11, a voltage control signal S1 for controlling the operation of the power supply circuit 11. In a turning-on control for turning on the light source 2, the voltage controller 14a compares the detection voltage Vs1 with a target value. When the detection voltage Vs1 is lower than the target value in the turning-on control, the voltage controller 14a outputs, to the power supply circuit 11, a voltage control signal S1 indicative of an increase of the DC voltage Vo1. When the detection voltage Vs1 is higher than the target value in the turning-on control, the voltage controller 14a outputs, to the power supply circuit 11, a voltage control signal S1 indicative of a decrease of the DC voltage Vo1. The voltage control signal S1 may be a signal for controlling a switching operation of a switching device included in the power supply circuit 11, for example. The power supply circuit 11 is configured to adjust the DC voltage Vo1 by way of the voltage control signal S1.

The control circuit 14 is configured to receive a dimming signal S2 from an external controller. The dimming signal S2 indicates a desired dimming level of the light source 2. Hereinafter, the desired dimming level indicated by the dimming signal S2 is referred to as a dimming instruction value. The reference setter 14b is configured to generate the reference voltage Vr1 based on the dimming signal S2 to output the reference voltage Vr1. The reference voltage Vr1 is supplied to the non-inverting input terminal of the operational amplifier 123a.

A current control realized by the constant current circuit 12 will be explained.

The reference voltage Vr1 is supplied to the non-inverting terminal of the operational amplifier 123a. According to a characteristic of an imaginary short of the operational amplifier 123a, the output voltage of the operational amplifier 123a is adjusted so that the potential at the inverting input terminal of the operational amplifier 123a equals to the reference voltage Vr1. That is, the operational amplifier 123a is configured to output an output voltage such that a relation Vr1=Id*R112 is satisfied, where Id denotes a drain current of the FET 121, and R122 denotes a resistance of the detection resistor 122. Note that a product (Id*R112) of the drain current Id of the FET 121 and the resistance R122 of the detection resistor 122 corresponds to a voltage value of a voltage across the detection resistor 122, and will be referred to as a detection voltage Vs2 (Vs2=Id*R122).

Since the output voltage of the operational amplifier 123a is applied to the gate of the FET 121, the gate voltage (gate-source voltage) of the FET 121 is determined by the reference voltage Vr1. The gate voltage of the FET 121 follows the Id-Vgs characteristics showing a relation between the gate-source voltage (Vgs) of the FET 121 and the drain current (Id). The drain current Id of the FET 121 can be regulated by the gate voltage of the FET 121 being adjusted by the current regulator 123. Therefore, when the reference setter 14b sets the reference voltage Vr1 to an appropriate voltage based on the dimming signal S2 and the drain current Id of the FET 121 is controlled by the current regulator 123 so that the detection voltage Vs2 equals to the reference voltage Vr1, the dimming level of the light source 2 can be controlled.

In the embodiment, a permissible range of the reference voltage Vr1 (within which the reference voltage Vr1 can be varied) and the resistance R122 of the detection resistor 122 are determined in advance so as to satisfy a desired specification of a range of the dimming level of the lighting device 1. Also, the reference setter 14b is configured to set a desired reference voltage Vr1 based on the received dimming signal S2. As a result, the magnitude of the drain current Id can be adjusted within a desired range. That is, with the constant current circuit 12 receiving the reference voltage Vr1 which is generated based on the received dimming signal S2, the constant current circuit 12 can cause the desired drain current Id according to the dimming instruction value to flow through the FET 121, and a result the dimming level of the light source 2 can be adjusted.

In a turning-off control for turning off the light source 2, the reference setter 14b sets the reference voltage Vr1 to 0 [V] to turn off the FET 121. That is, the power supply circuit 11 continues operating even when the light source 2 is off. That is, the FET 121 is turned off while the power supply circuit 11 continues outputting the DC voltage Vo1. An operation of turning off the FET 121 while the power supply circuit 11 continues outputting the DC voltage Vo1 may be referred to as "dimming switch (choko-giri)".

There is however a possibility that a certain current may flow through the light source 2 due to a leak current of the FET 121, when the FET 121 is turned off while the power supply circuit 11 continues outputting the DC voltage Vo1. There is also a possibility that, even when the FET 121 is turned off, a current may flow through an electric path from the output terminal 113 to the DC power supply 16 through the light source 2, the second limiting resistor 132 and the diode 15. That is, the light source 2 may continue emitting light even when the turning-off control is performed.

In view of the above, in the embodiment, a forward voltage Vf of the light source 2 (voltage across the first limiting resistor 131) is suppressed during the turning-off control by way of the limiting circuit 13 and a voltage control of the DC voltage Vo1 by the voltage controller 14a.

Specifically, in the turning-off control, the voltage controller 14a firstly increases the DC voltage Vo1 to make the diode 15 conductive. That is, an electric path is allowed to be made from the output terminal 113 through the first limiting resistor 131, the second limiting resistor 132, and the diode 15 to the DC power supply 16, and a current I3 flows through the second limiting resistor 132. In this time, the detection voltage Vs1 is clamped (held) at the upper limit voltage (sum of the control voltage Vd1 and the forward voltage of the diode 15). In the embodiment, the resistances of the first limiting resistor 131 and the second limiting resistor 132 and a voltage value of the DC voltage Vo1 are set such that the voltage (Vf) across the first limiting resistor 131 in the turning-off control is lower than a forward voltage of the light source 2 at which the light source 2 starts emitting light. In the embodiment, the second limiting resistor 132 functions as a limiting resistor for limiting the current I3. The forward voltage of the light source 2 at which the light source 2 starts emitting light means a sum of forward voltages of the LEDs 21 connected in series at which the LEDs 21 start emitting light, and is referred to as a lighting start voltage of the light source 2. Therefore, in the turning-off control, the forward voltage Vf of the light source 2 is lower than the lighting start voltage and accordingly it is possible to prevent the light source 2 from emitting light.

On the other hand, in the turning-on control (including a dimming control) of the light source 2 by the control circuit 14, a drain current Id flowing through the detection resistor 122 equals to a sum of the load current I1 flowing through the light source 2 and a non-load current I4 flowing from the first limiting resistor 131 to the FET 121. The non-load current I4 is defined as a current obtained by subtracting a current I3 flowing through the second limiting resistor 132 from the current I2 flowing through the first limiting resistor 131.

In the embodiment, in the turning-on control, the voltage controller 14*a* adjusts the DC voltage Vo1 so that the diode 15 is made non-conductive in order to cause the current I3 to 0 in the turning-on control. The current I3 in the turning-on control is set to be 0, and thus the detection voltage Vs1 equals to a voltage Va (drain voltage of the FET 121) at a connection point of the first limiting resistor 131 and the second limiting resistor 132 in the turning-on control. In the turning-on control, the non-load current I4 equals to the current I2 flowing through the first limiting resistor 131.

Specifically, in the turning-on control, the voltage controller 14*a* sets a target value of the detection voltage Vs1 to a value smaller than a sum of the control voltage Vd1 and the forward voltage of the diode 15, and adjusts the DC voltage Vo1 so that the detection voltage Vs1 equals to the target value. As a result, the diode 15 is made non-conductive, and the current I3 is made to 0 in the turning-on control.

In the embodiment, the control voltage Vd1 is set to 5 [V], and the target value is set to 3 [V]. In the turning-on control, the voltage controller 14*a* adjusts the DC voltage Vo1 so that the detection voltage Vs1 equals to 3 [V].

The drain current 1*d* is a sum of the load current I1 and the non-load current I4. Therefore, the detection voltage Vs2 is represented by the formula: Vs2=(I1+I4)*R122. With the regulation of the drain current Id by the constant current circuit 12, the detection voltage Vs2 is adjusted to the reference voltage Vr1. As a result, the sum of the load current I1 and the non-load current I4 (I1+I4) is controlled.

Figure 2:
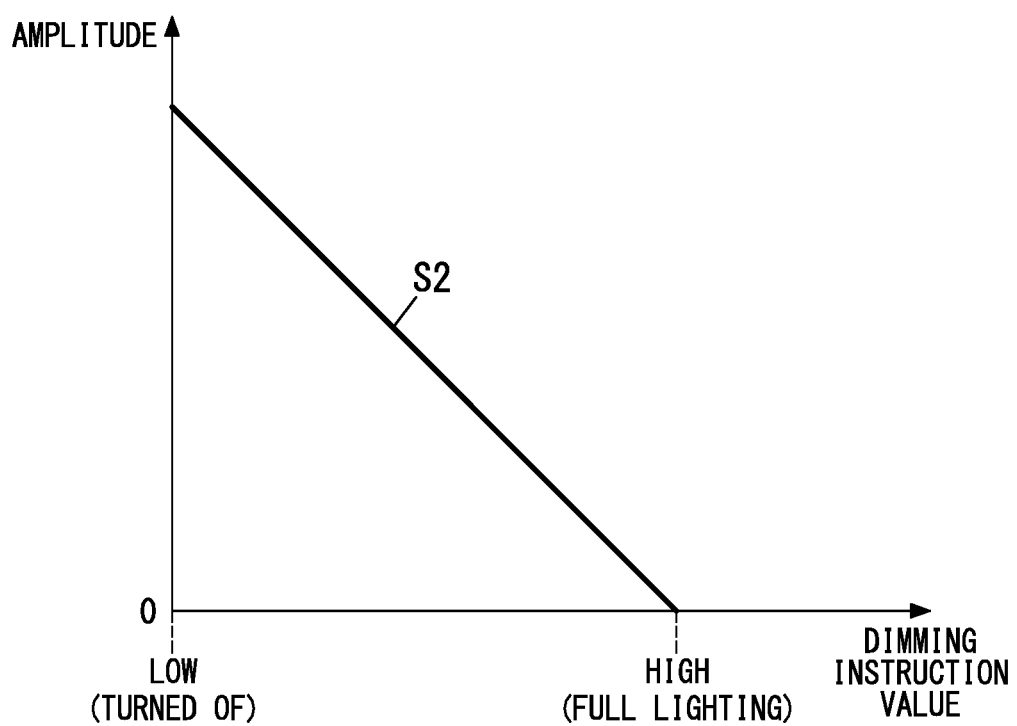
FIG. 2 is a graph illustrating a characteristic of a dimming signal used along with the lighting device according to the embodiment.

As shown in FIG. 2, the dimming signal S2 is a voltage signal, of which amplitude decreases as an increase in the dimming instruction value and increases as a decrease in the dimming instruction value. The dimming signal S2 has the amplitude which is determined based on only the dimming instruction value (or a load current I1 corresponding thereto). The dimming signal S2 may be generated by averaging (smoothing) a PWM signal having an ON-duty that indicates the dimming instruction value. Note that in an alternative example, the dimming signal S2 may be a voltage signal, of which amplitude increases as an increase in the dimming instruction value and decreases as a decrease in the dimming instruction value.

Here, a lighting device of a comparative example will be explained. The lighting device of the comparative example is configured to, when receiving a dimming signal S2 as shown in top of FIG. 3, generate a pulsed voltage signal S3 (see middle of FIG. 3) based on a received dimming signal S2, and generate a reference voltage Vr21 (see bottom of FIG. 3) by averaging the pulsed voltage signal S3. Note that the reference voltage Vr21 in the comparative example is equivalent to (functions as) the reference voltage Vr1 in the lighting device 1 of the present embodiment.

Specifically, the lighting device of the comparative example is configured to determine a dimming instruction value indicated by the dimming signal S2 based on amplitude of the dimming signal S2. For example, the lighting device of the comparative example acquires, from the received dimming signal S2, amplitude of the received dimming signal S2 as a dimming instruction value. The lighting device of the comparative example generates, by itself, the pulsed voltage signal S3 according to the dimming instruction value. The pulsed voltage signal S3 is a pulsed voltage signal with a cycle length of T10, and has an on-period T11 and an off-period T12. The pulsed voltage signal S3 has an ON-duty (T11/T10) which increases as an increase of the dimming instruction value and decreases as a decrease of the dimming instruction value. The lighting device of the comparative example sets the reference voltage Vr21 to a positive voltage obtained by averaging the pulsed voltage signal S3.

That is, the lighting device of the comparative example generates the pulsed voltage signal S3 based on the dimming signal S2, and generates the reference voltage Vr21 by averaging the pulsed voltage signal S3. The lighting device of the comparative example has the substantially same circuit configuration as that shown in FIG. 1, but employs the reference voltage Vr21 for this comparative example instead of employing the reference voltage Vr1. Therefore, in a control of a dimming level of a light source 2 by the lighting device of the comparative example, a drain current Id of an FET 121 is controlled so that a detection voltage Vs2 equals to the reference voltage Vr21. However, it should be noted that the reference voltage Vr21 is determined without reflecting the influence of the non-load current I4. Therefore, with the operation of the current regulator 123 regulating the drain current Id so that the detection voltage Vs2 equals to the reference voltage Vr21, the load current I1 is smaller than a current required to operate the light source 2 with the dimming instruction value indicated by the dimming signal S2, by the non-load current I4. That is, the actual dimming level of the light source 2 is smaller than the desired dimming level indicated by the dimming signal S2.

This influence of the non-load current I4 increases as a decrease of the dimming instruction value. That is, a ratio of the actual dimming level to the instructed dimming level (represented by "actual dimming level/indicated (desired) dimming level) decreases, as the dimming instruction value decreases, and therefore influence of the non-load current I4 on the drain current Id would increase.

For example, in a fade-in control in which the dimming instruction value is gradually increased from the turned-off state, the light source 2 may start emitting light at a timing which is later than a desired timing. Also, in a fade-out control in which the dimming instruction value is gradually decreased from the turned-on state, the light source 2 may stop emitting light at a timing which is earlier than a desired timing.

Figure 4:
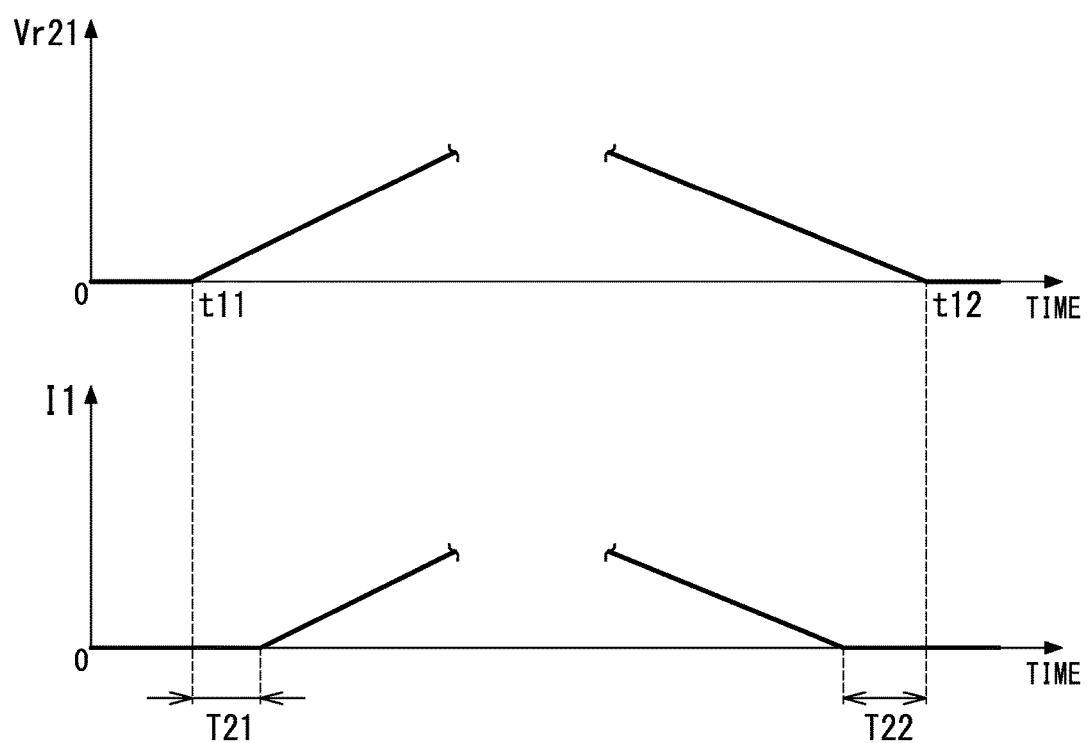
FIG. 4 is wave form charts illustrating fade-in and fade-out operations of the lighting device according to the comparative example.

FIG. 4 illustrates time charts of the reference voltage Vr21 and the load current I1 in the fade-in control and the fade-out control according to the comparative example. The fade-in control is started at a time point t11 to gradually increase the reference voltage Vr21 from 0 [V]. However, the load current I1 starts to flow at a time point which is later than the time point t11 by a time duration T21. That is, a light emission start time by the fade-in control is later than a start time of the fade-in control. In a similar manner, the reference voltage Vr21 decreases gradually by the fade-out control to decrease the load current I1 gradually. The reference voltage Vr21 reaches 0 [V] at a time point t12, but the load current I1 already reaches 0 [A] at a time point which is earlier than the time point t12 by a time duration T22. That is, a light emission stop time by the fade-out control is before a stop time of the fade-out control.

Figure 5:
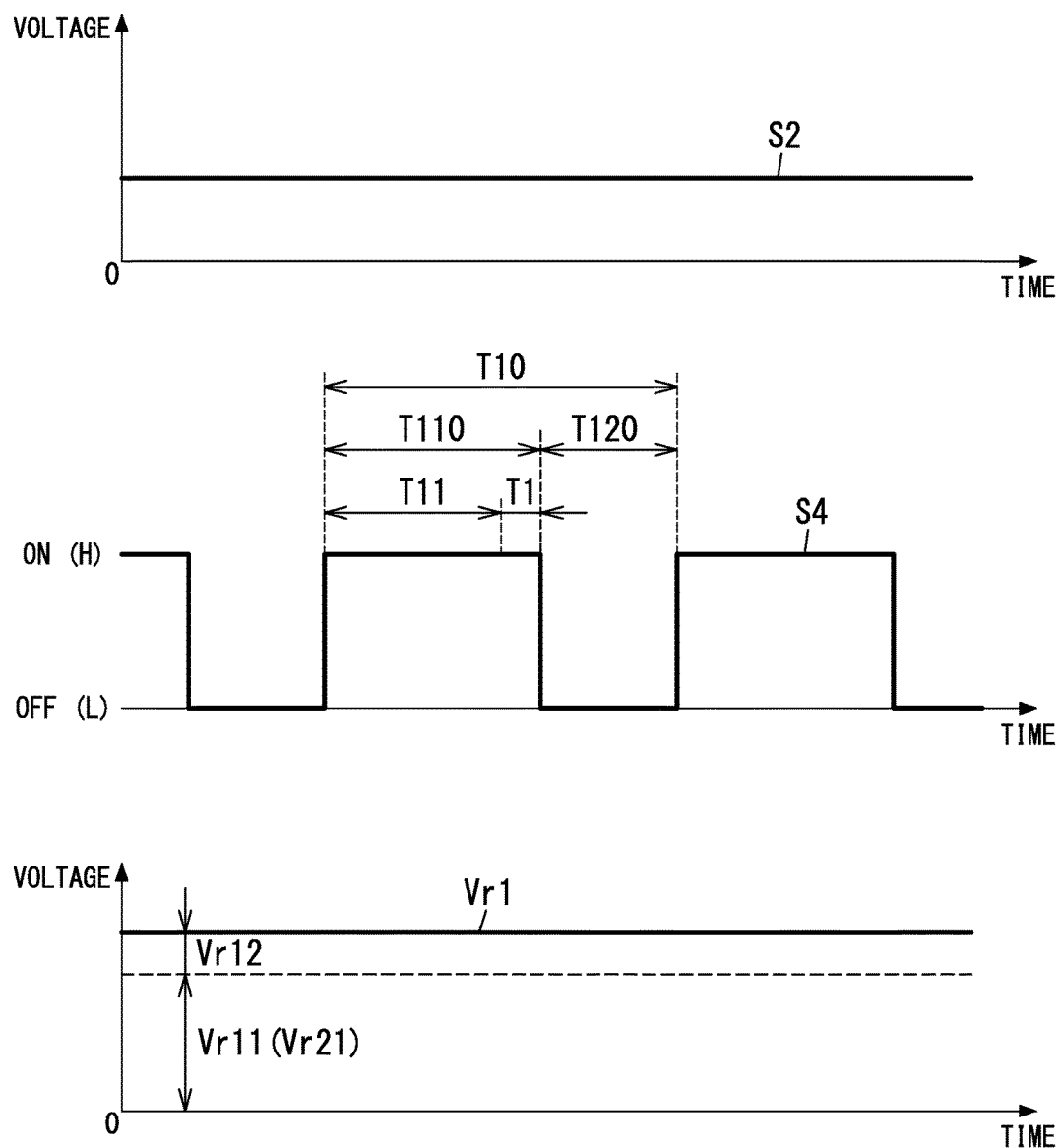
FIG. 5 is a wave form chart illustrating an operation of the lighting device according to the embodiment.

In view of the above, in the embodiment, the reference setter 14b is configured to generate the reference voltage Vr1 in accordance with a process illustrated in FIG. 5, in response to input of the dimming signal S2.

The reference setter 14b firstly determines the dimming instruction value based on amplitude of the dimming signal S2. Specifically, the reference setter 14b acquires, from the dimming signal S2, a value (level) of the amplitude of the dimming signal S2 as the dimming instruction value, and employs (the acquired value of) the amplitude of the dimming signal S2 as the dimming instruction value. The reference setter 14b then generates a pulsed voltage signal S4 according to the dimming instruction value. The pulsed voltage signal S4 is a pulsed voltage signal with a cycle length of T10, and has an on-period T110 and an off-period T120.

Specifically, in order to generate the pulsed voltage signal S4, the reference setter 14b retrieves reference data from a memory, and check the acquired dimming instruction value against the reference data to generate the pulsed voltage signal S4. The reference data includes data of the cycle length T10, and also shows a correspondence relationship between the dimming instruction value and a length of the on-period T110 or showing a correspondence relationship between the dimming instruction value and a length of the off-period T120. Alternatively, the reference data shows a correspondence relationship between the dimming instruction value and a length of the on-period T110 and also shows a correspondence relationship between the dimming instruction value and a length of the off-period T120. The pulsed voltage signal S4 is a signal having an ON-duty (T110/T10) which increases as an increase of the dimming instruction value and decreases as a decrease of the dimming instruction value. Note that the data described above may be preliminarily stored in at least one of a built-in memory of the reference setter 14b, a built-in memory of the control circuit 14, and an external memory of the control circuit 14.

Figure 3:
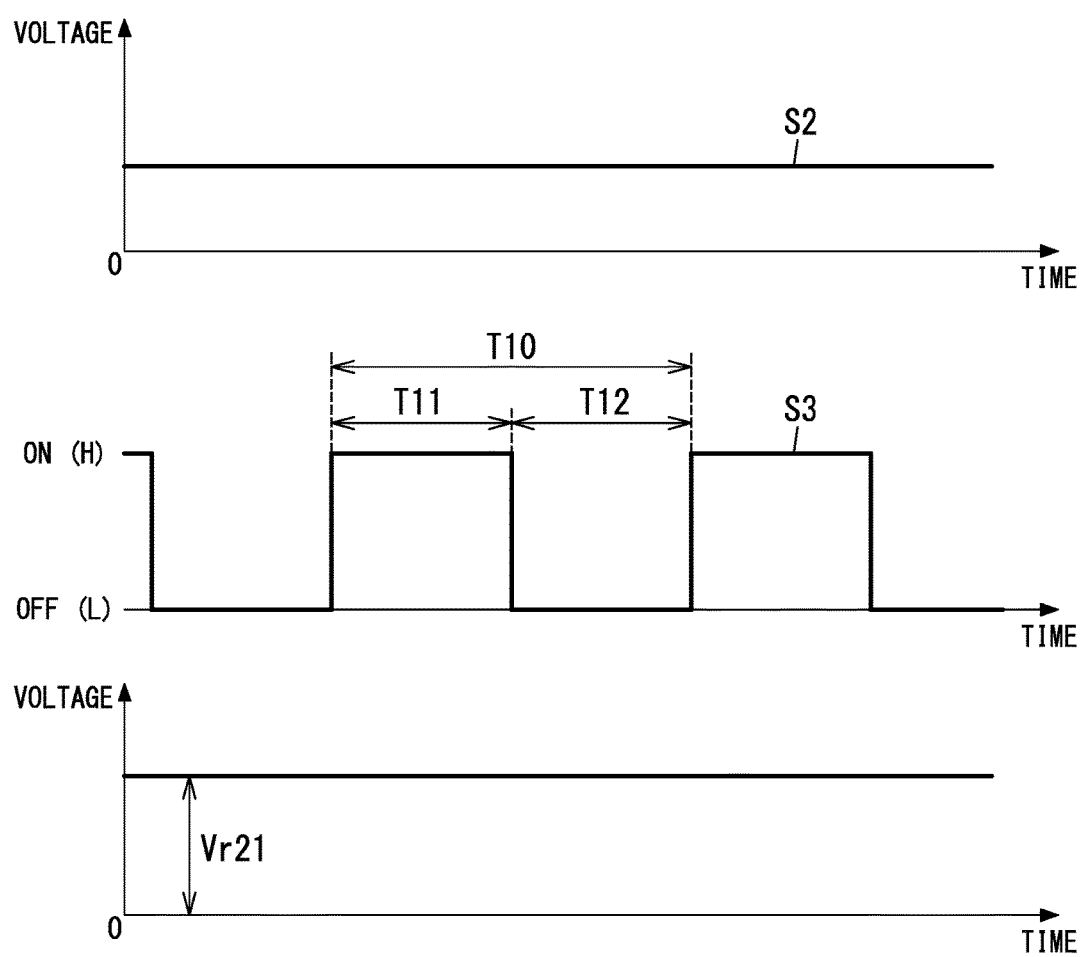
FIG. 3 is a wave form chart illustrating an operation of a lighting device according to a comparative example.

Comparing FIG. 5 with FIG. 3, with regard to the same dimming instruction value, the on-period T110 of the pulsed voltage signal S4 is longer, by a correction time T1, than the on-period T11 (see FIG. 3) of the pulsed voltage signal S3.

Figure 6:
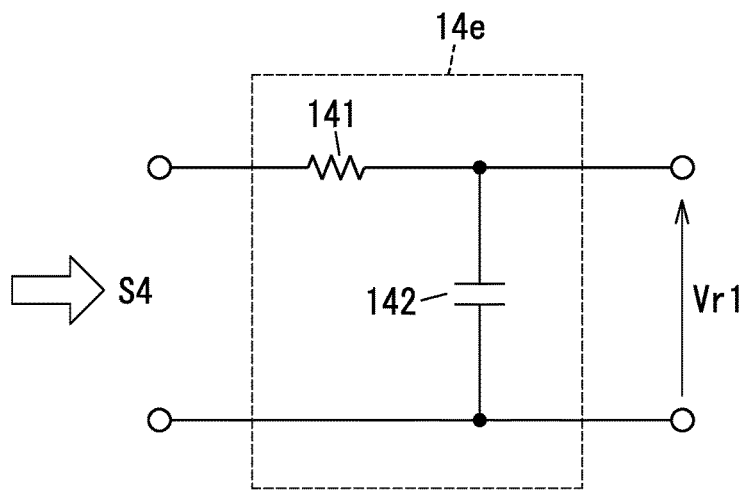
FIG. 6 is a circuit diagram illustrating a smoother circuit in the lighting device according to the embodiment.

The reference setter 14b includes a smoother circuit 14e shown in FIG. 6. The smoother circuit 14e includes a resistor 141 and a capacitor 142, and the pulsed voltage signal S4 is smoothed (averaged) by the resistor 141 and the capacitor 142. A voltage across the capacitor 142 serves as the reference voltage Vr1. Therefore, the reference voltage Vr1 is a positive voltage of which amplitude increases as an increase in the dimming instruction value and decreases as a decrease in the dimming instruction value.

Therefore, the reference voltage Vr1 has a value obtained by adding, to a positive first voltage Vr11 resulting from smoothing the pulsed voltage signal S3 of the comparative example (equals to the reference voltage Vr21 employed in the comparative example), a second voltage Vr12. In other words, the reference voltage Vr1 is higher than the reference voltage Vr21 employed in the comparative example by the second voltage Vr12. The correction time T1 is determined in advance so that the second voltage Vr12 has a desired value. The second voltage Vr12 increases as an increase of the correction time T1, and the second voltage Vr12 decreases as a decrease of the correction time T1.

Hereinafter, the second voltage Vr12 is referred to as a correction voltage Vr12. The correction voltage Vr12 is determined in accordance with the following manner.

The first voltage Vr11 is equal to a voltage (=I1*R122) developing across the detection resistor 122 as a result of a load current I1, which corresponds to a dimming instruction value of the dimming signal S2, flowing through the detection resistor 122.

The non-load current I4 is represented by the following equation (1), where R131 denotes a resistance of the first limiting resistor 131, and Vf denotes the forward voltage of the light source 2 (equals to the voltage across the first limiting resistor 131).

$$I4=Vf/R131 \tag{1}$$

Figure 7:
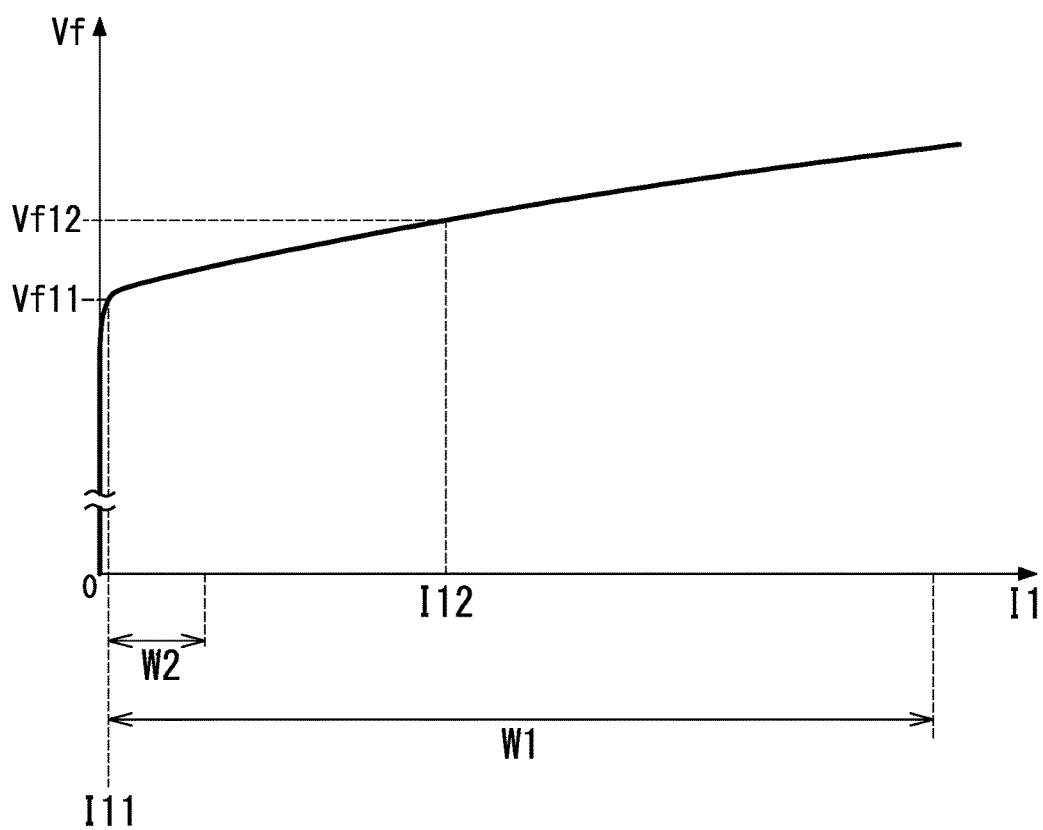
FIG. 7 is a graph illustrating a current-voltage characteristic of the lighting device according to the embodiment.

According to the equation (1), the non-load current I4 depends on the forward voltage Vf of the light source 2. As shown in FIG. 7, the forward voltage Vf increases as an increase in the load current I1. Specifically, the forward voltage Vf increases as an increase in a dimming level, and the forward voltage Vf decreases as a decrease in the dimming level. In the example of FIG. 7, the load current I1 equals to I11 and the forward voltage Vf equals to Vf11 at a dimming lower limit at which influence of the non-load current I4 is maximum.

In the embodiment, a specific non-load current I41 is determined based on the forward voltage Vf11 (see the following equation (2)) at the dimming lower limit at which influence of the non-load current I4 is maximum. The correction voltage Vr12 is determined based on the specific non-load current I41 (see the following equation (3)). The specific non-load current I41 equals to the current I2 flowing through the first limiting resistor 131 at the dimming lower limit. The correction voltage Vr12 equals to a voltage (=I41*R122) developing across the detection resistor 122 as a result of the specific non-load current I41 flowing through the detection resistor 122.

$$I41=(Vf11/R131) \tag{2}$$

$$Vr12=I41*R122 \tag{3}$$

That is, in the embodiment, the correction voltage Vr12 (the second voltage) is constant. Note that the forward voltage Vf11 is not limited to the forward voltage Vf at the dimming lower limit (at which the load current I1 equals to I11). For example, the forward voltage Vf11 may be a forward voltage which corresponds to a certain dimming level within a lower dimming level range W2, corresponding to comparatively lower dimming levels (see FIG. 7), included in a whole of a permissible range W1 of the dimming level. Alternatively, the forward voltage Vf11 may be a representative value of the forward voltage Vf within the lower dimming level range W2, such as a center value of the forward voltage Vf in the lower dimming level range W2 (certain range in a lower dimming level), an average value of the forward voltage Vf in the lower dimming level range W2, or the like. Note that the lower dimming level range W2 contains the dimming lower limit.

The reference voltage Vr1 is determined by the following equation (4).

$$Vr1 = Vr11 + Vr12 \quad (4)$$

When receiving the reference voltage Vr1 determined by the equation (4), the constant current circuit 12 regulates the drain current Id such that the detection voltage Vs2 equals to the reference voltage Vr1. Since the reference voltage Vr1 is determined by adding the correction voltage Vr12 derived from the specific non-load current I41, the drain current Id regulated equals to a sum of: the load current I1 necessary for the dimming instruction value indicated by the dimming signal S2; and the specific non-load current I41. Accordingly, the load current I1 substantially equals to a current value necessary for the dimming instruction value indicated by the dimming signal S2. As a result, the actual dimming level of the light source 2 can be substantially equaled to the desired dimming level indicated by the dimming signal S2.

Figure 8:
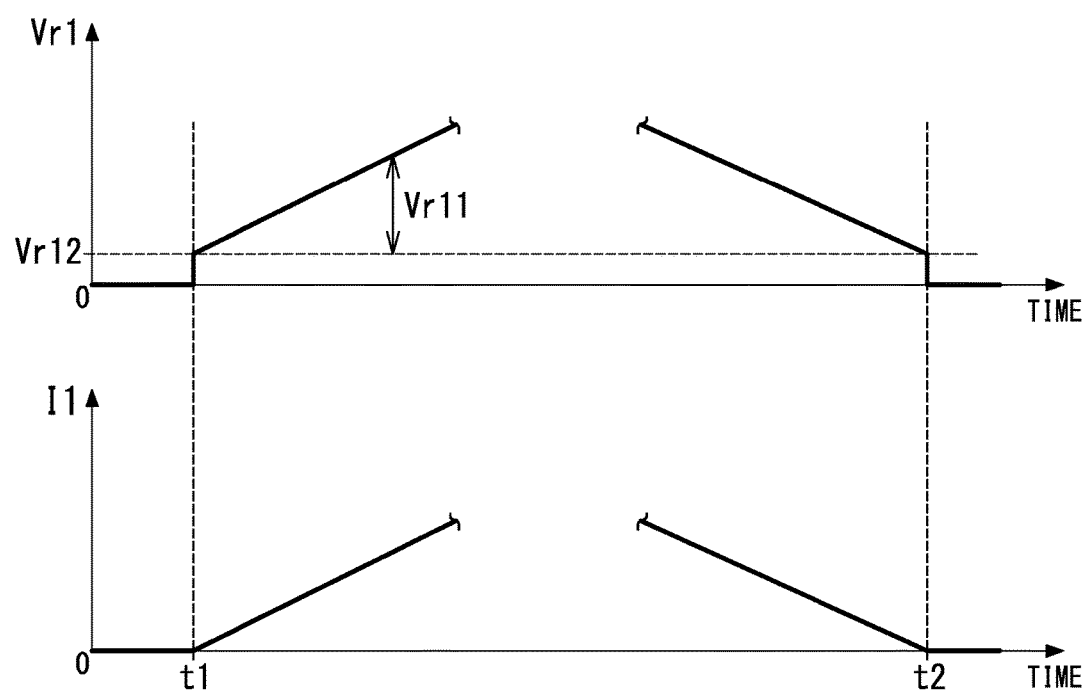
FIG. 8 is wave form charts illustrating fade-in and fade-out operations of the lighting device according to the embodiment.

FIG. 8 illustrates time charts of the reference voltage Vr1 and the load current I1 in a fade-in control and a fade-out control according to the embodiment. Before a time point t1, the FET 121 is turned off while the DC voltage Vo1 is larger than that in a case of the turning-on control to make the diode 15 conductive, and the light source 2 is turned off. During a period from the time point t1 to a time point t2 in which the turning-on control is performed, the DC voltage Vo1 is adjusted so that the detection voltage Vs1 equals to 3 [V]. Referring back to the time point t1, at which the fade-in control is started, the reference voltage Vr1 is changed from 0 [V] to the correction voltage Vr12, and the reference voltage Vr1 starts increasing from the correction voltage Vr12. In the embodiment, the load current I1 starts flowing at the time point t1. Therefore, a light emission start time by the fade-in control agrees with a start time of the fade-in control. In the fade-out control, the reference voltage Vr1 gradually decreases and the load current I1 gradually decreases as well. The reference voltage Vr1 reaches the correction voltage Vr12 at the time point t2, and the load current I2 reaches 0 [A] at the time point t2 as well. That is, a light emission stop time by the fade-out control agrees with a stop time of the fade-out control. After the time point t2, the FET 121 is turned off while the DC voltage Vo1 is larger than that in a case of the turning-on control to make the diode 15 conductive, and the light source 2 is turned off. Note that in the turning-off control of the light source 2, the reference setter 14b sets the reference voltage Vr1 to 0 [V].

With the lighting device 1 of the embodiment, it is possible to prevent the light source 2 from emitting light in the turning-off control by way of the limiting circuit 13. Moreover, with the lighting device 1, the load current I1 can have a current value close to that necessary for the dimming instruction value indicated by the dimming signal S2, since the reference setter 14b generates the reference voltage Vr1 reflecting the influence of the non-load current I4 in addition to the load current I1. The lighting device 1 therefore can offer improved current control accuracy.

A modification of the embodiment is explained below.

A reference setter 14b of the modification is configured to set a correction voltage Vr12 (second voltage) according to the following manner.

As shown in FIG. 7, a forward voltage Vf depends on a load current I1. The load current I1 varies according to a dimming level, and thus the forward voltage Vf varies according to the dimming level.

In the modification, a reference setter 14b preliminarily stores data (dimming data) that directly or indirectly shows a correspondence relationship between a dimming level and a forward voltage Vf. Here, the reference setter 14b is configured to determine the desired dimming level (dimming instruction value) indicated by a dimming signal S2 based on amplitude of the dimming signal S2. Note that the dimming signal S2 is such a signal that the dimming instruction value indicated by the dimming signal S2 increases as a decrease in the amplitude of the dimming signal S2, and the dimming instruction value indicated by the dimming signal S2 decreases as an increase in the amplitude of the dimming signal S2 (see FIG. 2). Specifically, the dimming data may include a table in which (values of) the dimming instruction value (or amplitude of the dimming signal S2) and (values of) the forward voltage Vf are associated with each other. The reference setter 14b acquires, from the dimming signal S2, a value (level) of the amplitude of the dimming signal S2 as the dimming instruction value, and retrieves, from the dimming data, a (value of) forward voltage Vf12 associated with the acquired amplitude of the dimming signal S2 (in this example, amplitude associated with a value I12 of the load current I1 shown in FIG. 7). After retrieving the forward voltage Vf12 from the dimming data, the reference setter 14b determines a specific non-load current I42 based on the retrieved forward voltage Vf12 (see the following equation (5)), and determines a correction voltage Vr12 based on the specific non-load current I42 (see the following equation (6)). The specific non-load current I42 equals to the current I2 flowing through the first limiting resistor 131. The correction voltage Vr12 equals to a voltage (=I42*R122) developing across the detection resistor 122 as a result of the specific non-load current I42 flowing through the detection resistor 122.

$$I42 = (Vf12/R131) \quad (5)$$

$$Vr12 = I42 * R122 \quad (6)$$

Note that the dimming data may be preliminarily stored in at least one of a built-in memory of the reference setter 14b, a built-in memory of a control circuit 14, and an external memory of the control circuit 14.

In brief, the reference setter 14b refers to the data showing a relationship between the dimming level (dimming instruction value) and the forward voltage Vf, determines the correction voltage Vr12 based on the forward voltage Vf12 associated with the dimming instruction value, and determines a correction time T1. The correction time T1 (the correction voltage Vr12 (the second voltage)) would vary according to the dimming instruction value. Note that the dimming data may be preliminarily stored in at least one of the built-in memory of the reference setter 14b, the built-in memory of the control circuit 14, and the external memory of the control circuit 14, as described above. Moreover, the data showing a correspondence relationship between the dimming instruction value and a length of the on-period T11 may be preliminarily stored in at least one of the built-in memory of the reference setter 14b, the built-in memory of the control circuit 14, and the external memory of the control circuit 14.

The reference voltage Vr1 is determined by the equation (4) described above. When receiving the reference voltage Vr1, the constant current circuit 12 regulates the drain current Id such that the detection voltage Vs2 equals to the reference voltage Vr1. Since the reference voltage Vr1 is determined by adding the correction voltage Vr12 that varies according to the dimming instruction value, the load current I1 can be controlled more accurately by the constant current circuit 12 so that the current (actual) dimming level comes closer to the dimming instruction value.

Figure 9A:
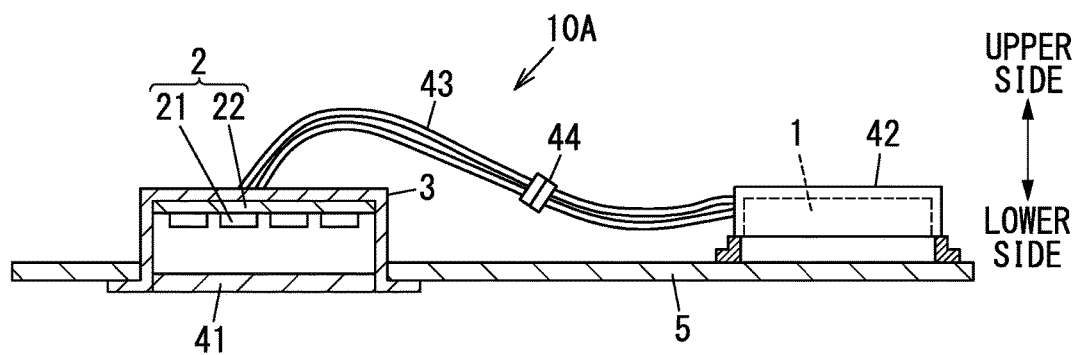
FIG. 9A is a cross-sectional view of a luminaire according to the embodiment.

FIG. 9A shows a luminaire 10A serving as a downlight recessed in a ceiling panel 5. The luminaire 10A includes the above-described lighting device 1, the light source 2, and a casing 3. The casing 3 is formed from metal such as aluminum into a bottomed circular cylindrical shape with a closed upper face and an open lower face. The light source 2 is provided to the bottom of the upper face of the casing 3. The light source 2 includes LEDs 21 and a substrate 22 on which the LEDs 21 are mounted. The open lower face of the casing 3 is closed by a cover 41 having a circular plate shape. The cover 41 may be made of material having translucency, such as glass or polycarbonate. The lighting device 1 is housed in a metal case 42 having a rectangular box shape and disposed on an upper face of the ceiling panel 5. The lighting device 1 is electrically connected to the light source 2 through an electrical cable 43 and connectors 44.

Figure 9B:
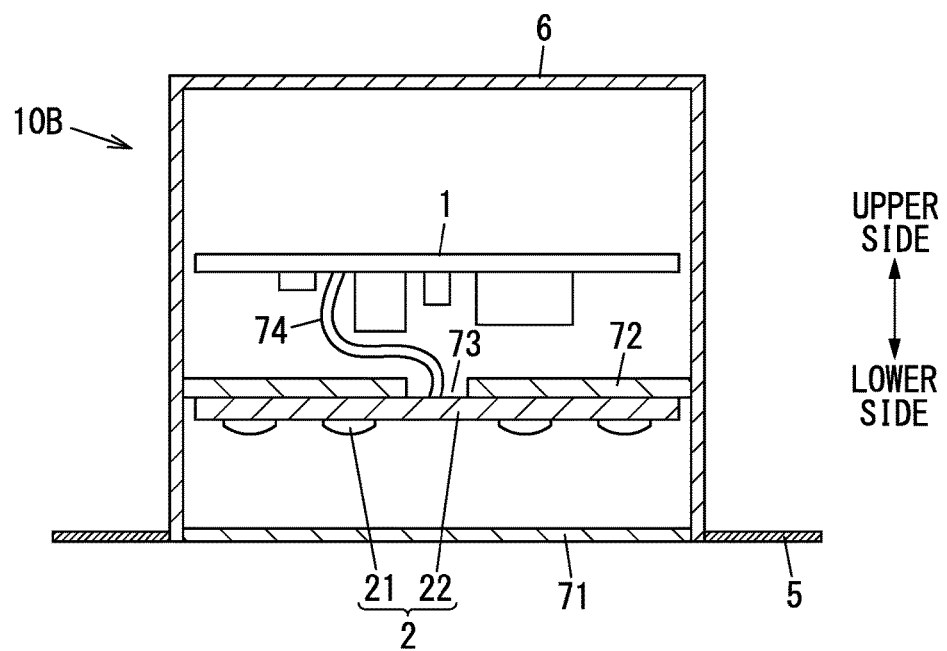
FIG. 9B is a cross-sectional view of another luminaire according to the embodiment.

FIG. 9B shows a luminaire 10B serving as another kind of a downlight recessed in a ceiling panel 5. The luminaire 10B includes the above-described lighting device 1, the light source 2, and a casing 6. The casing 6 is formed from metal such as aluminum into a bottomed circular cylindrical shape with a closed upper face and an open lower face. The open lower face of the casing 6 is closed by a cover 71 having a circular plate shape. The cover 71 may be made of material having translucency, such as glass or polycarbonate. Inner space of the casing 6 is divided into an upper region and a lower region by a partition board 72 having a circular plate shape. The lighting device 1 is disposed in the upper region above the partition board 72. The light source 2 is disposed on a lower face of the partition board 72. The lighting device 1 is electrically connected to the light source 2 through an electrical cable 74 passing through a cable hole 73 provided in the partition board 72.

Each of the luminaires 10A and 10B includes the lighting device 1 described above. Therefore, each of the luminaires 10A and 10B can offer improved current control accuracy.

In an alternative example, the light source 2 is not limited to the LED 21, but may include other solid-state light emitting element such as an organic electroluminescence element (OEL), laser diode (LD) and the like.

It is apparent from the above, a lighting device 1 according to a first aspect includes a power supply circuit 11, a constant current circuit 12, a reference setter 14b, and a first limiting resistor 131. The power supply circuit 11 includes two output terminals 113, 114 and configured to output a DC voltage Vo1 through the two output terminals 113, 114 to supply a DC power to a light source 2 that includes at least one LED 21 (solid-state light emitting element). The constant current circuit 12 includes a series circuit of a FET 121 (transistor) and a detection resistor 122 configured to be electrically connected in series with the light source 2 between the two output terminals 113, 114, and a current regulator 123 configured to control the FET 121 to adjust a current flowing through the series circuit of the FET 121 and the detection resistor 122 so that a detection voltage Vs2 (voltage across the detection resistor 122) is equal to a reference voltage Vr1. The reference setter 14b is configured to adjust the reference voltage Vr1 in accordance with a dimming instruction value corresponding to a desired dimming level of the light source 2 indicated by a dimming signal S2. The first limiting resistor 131 is to be connected in parallel to the light source 2. The reference setter 14b is configured to set the reference voltage Vr1 to a sum of a first voltage Vr11 and a second voltage Vr12 (correction voltage). The first voltage Vr11 is equal to a voltage developing across the detection resistor 122 as a result of a first current flowing through the detection resistor 122, the first current having a same magnitude as a current supplied to the light source 2 so that a current dimming level of the light source 2 is equal to the dimming instruction value. The second voltage Vr12 is equal to a voltage developing across the detection resistor 122 as a result of a second current flowing through the detection resistor 122, the second current having a same magnitude as a current flowing from the first limiting resistor 131 to the FET 121 while the light source 2 is on.

With the lighting device 1 according to the aspect, it is possible to prevent, by the first limiting resistor 131, the light source 2 from emitting light in the turning-off control. Moreover, with the lighting device 1, since the reference setter 14b generates the reference voltage Vr1 reflecting both the load current I1 and the non-load current I4, the load current I1 can be close to the desired dimming level indicated by the dimming signal S2. That is, the lighting device 1 can offer improved current control accuracy and can prevent the light source 2 from emitting light in the turning-off control.

A lighting device 1 according to a second aspect, realized in combination with the first aspect, further including a second limiting resistor 132 connected in series with the first limiting resistor 131 to constitute a series circuit of the first limiting resistor 131 and the second limiting resistor 132. The series circuit of the first limiting resistor 131 and the second limiting resistor 132 is electrically connected between the two output terminals 113, 114. The current regulator 123 is configured to turn off the FET 121 while the power supply circuit 11 outputs the DC voltage Vo1 to thereby perform a turning-off control of the light source 2. The DC voltage Vo1 in the turning-off control, and resistances of the first limiting resistor 131 and the second limiting resistor 132 are set such that a voltage across the first limiting resistor 131 (forward voltage Vf) is lower than a lighting start voltage of the light source 2 in the turning-off control.

With the lighting device 1 according to the aspect, it is possible to prevent, by the first limiting resistor 131 and the second limiting resistor 132, the light source 2 from emitting light in the turning-off control.

A lighting device 1 according to a third aspect, realized in combination with the second aspect, further including a diode 15 and a voltage controller 14a. The diode 15 is connected in series with the series circuit of the first limiting resistor 131 and the second limiting resistor 132. The voltage controller 14a is configured to control the power supply circuit 11 to adjust the DC voltage Vo1 outputted across the two output terminals 113, 114. A first end of the first limiting resistor 131 is electrically connected to a high potential side output terminal 113 of the two output terminals 113, 114. A second end of the first limiting resistor 131 is electrically connected to a first end of the second limiting resistor 132. A second end of the second limiting resistor 132 is electrically connected to an anode of the diode 15. A cathode of the diode 15 is electrically connected to a positive electrode of a DC power supply 16. A negative electrode of the DC power supply 16 is electrically connected to a low potential side output terminal 114 of the two output terminals 113, 114. The voltage controller 14a is configured to receive a detection voltage Vs1 which corresponds to a voltage at the anode of the diode 15. The voltage controller 14a is configured to, in a turning-on control for turning on the light source 2, set a target value to be smaller than a sum of a control voltage Vd1 of the DC power supply 16 and a forward voltage of the diode 15 and to adjust the DC voltage Vo1 so that the detection voltage Vs1 equals to the target value, thereby making the diode 15 non-conductive. The voltage controller 14a is configured to, in the turning-off control, adjust the DC voltage Vo1 so that the diode 15 is made to be conductive and also the voltage (forward voltage Vf) across the first limiting resistor 131 is lower than the lighting start voltage of the light source 2.

With the lighting device 1 according to the aspect, the current I3 flowing through the second limiting resistor 132 can be made 0 in the turning-on control. As a result, the non-load current I4 in the turning-on control is equal to the current I2 flowing through the first limiting resistor 131. The second voltage Vr12 (correction voltage) developing across the detection resistor 122 as a result of the non-load current I4 flowing through the detection resistor 122 can be determined based on the forward voltage Vf of the light source 2, and accordingly the reference voltage Vr1 reflecting the non-load current I4 can be determined easily.

In a lighting device 1 according to a fourth aspect, realized in combination with any one of the first to third aspects, the second voltage Vr12 is constant and has a value determined based on a specific forward voltage Vf11 of the light source 2 which corresponds to a specific dimming level (a dimming lower limit, for example) within a lower dimming level range included in a whole of a permissible range W1 of the dimming level.

Influence of the non-load current I4 on the dimming level increases as a decrease in the dimming level. With the use of the second voltage Vr12 which is constant and has a value determined based on the forward voltage Vf11 in a lower dimming level range, it is possible to improve the current control accuracy with a simple configuration.

In a lighting device 1 according to a fifth aspect, realized in combination with the fourth aspect, the specific dimming level is a dimming level of a dimming lower limit.

With the lighting device 1 according to the aspect, the second voltage Vr12 is constant and has a value determined based on the forward voltage Vf11 at the dimming lower limit at which the influence of the non-load current I4 is maximum. Accordingly, it is possible to further improve the current control accuracy with a simple configuration.

In a lighting device 1 according to a sixth aspect, realized in combination with any one of the first to third aspects, the second voltage Vr12 is constant and has a value determined based on a representative value of a forward voltage Vf of the light source 2, which corresponds to dimming levels within a lower dimming level range that contains a dimming lower limit and is included in a whole of a permissible range W1 of the dimming level.

With the lighting device 1 according to the aspect, the current control accuracy can be further improved especially in a certain range of the dimming level.

In a lighting device 1 according to a seventh aspect, realized in combination with any one of the first to third aspects, the reference setter 14b is configured to store in advance data showing a relationship between the dimming level and a forward voltage Vf of the light source 2. The reference setter 14b is configured to, based on the data, determine a forward voltage Vf12 of the light source 2 that corresponds to the dimming instruction value, and to determine the second voltage Vr12 based on the determined forward voltage Vf12 of the light source 2 corresponding to the dimming instruction value.

With this configuration, the reference setter 14b determines the second voltage Vr12 based on the forward voltage Vf12 of the light source 2 that varies according to the dimming instruction value. Therefore, the reference setter 14b can determine the second voltage Vr12 appropriate for the dimming instruction value, and thus the current control accuracy can be improved in a whole range of a permissible range of the dimming level.

A luminaire 10A, 10B according to an eighth aspect includes the lighting device 1 according to any one of the first to seventh aspects; the light source 2, the light source 2 including at least one LED 21 (solid-state light emitting element) and supplied with the DC power from the lighting device 1; and a casing 3, 6 to which the light source 2 is attached.

The luminaire 10A, 10B includes the lighting device 1, and accordingly can offer improved current control accuracy and can prevent the light source 2 from emitting light when the light source 2 is controlled to be off.

The above described embodiment and modifications are merely examples of the present disclosure. The present disclosure is not limited to the embodiment and modifications described above. Even in other than the embodiment and modifications described above, numerous modifications and variations can be made according to designs and the like without departing from the technical ideas according to the present disclosure.

The invention claimed is:

1. A lighting device, comprising:
   a power supply circuit including two output terminals and configured to output a DC voltage through the two output terminals to supply a DC power to a light source that includes at least one solid-state light emitting element;
   a constant current circuit including
      a series circuit of a transistor and a detection resistor configured to be electrically connected in series with the light source between the two output terminals, and
      a current regulator configured to control the transistor to adjust a current flowing through the series circuit so that a voltage across the detection resistor is equal to a reference voltage;
   a reference setter configured to adjust the reference voltage in accordance with a dimming instruction value corresponding to a desired dimming level of the light source indicated by a dimming signal; and
   a limiting resistor to be connected in parallel to the light source, wherein
   the reference setter is configured to set the reference voltage to a sum of a first voltage and a second voltage,
   the first voltage is equal to a voltage developing across the detection resistor as a result of a first current flowing through the detection resistor, the first current having a same magnitude as a current supplied to the light source so that a current dimming level of the light source is equal to the dimming instruction value, and
   the second voltage is equal to a voltage developing across the detection resistor as a result of a second current flowing through the detection resistor, the second current having a same magnitude as a current flowing from the limiting resistor to the transistor while the light source is on.

2. The lighting device of claim 1, wherein:
   the limiting resistor is defined as a first limiting resistor;
   the lighting device further comprises a second limiting resistor connected in series with the first limiting resistor to constitute a series circuit of the first limiting resistor and the second limiting resistor, the series circuit of the first limiting resistor and the second limiting resistor being electrically connected between the two output terminals;

the current regulator is configured to turn off the transistor while the power supply circuit outputs the DC voltage to thereby perform a turning-off control of the light source; and the DC voltage in the turning-off control, and resistances of the first limiting resistor and the second limiting resistor are set such that a voltage across the first limiting resistor is lower than a lighting start voltage of the light source in the turning-off control.

3. The lighting device of claim 2, further comprising:

a diode connected in series with the series circuit of the first limiting resistor and the second limiting resistor; and a voltage controller configured to control the power supply circuit to adjust the DC voltage outputted across the two output terminals, a first end of the first limiting resistor being electrically connected to a high potential side output terminal of the two output terminals, a second end of the first limiting resistor being electrically connected to a first end of the second limiting resistor, a second end of the second limiting resistor being electrically connected to an anode of the diode, a cathode of the diode being electrically connected to a positive electrode of a DC power supply, a negative electrode of the DC power supply being electrically connected to a low potential side output terminal of the two output terminals, the voltage controller being configured to receive a detection voltage which corresponds to a voltage at the anode of the diode, and the voltage controller being configured,
  to, in a turning-on control for turning on the light source, set a target value to be smaller than a sum of a voltage of the DC power supply and a forward voltage of the diode and to adjust the DC voltage so that the detection voltage equals to the target value, thereby making the diode non-conductive, and
  to, in the turning-off control, adjust the DC voltage so that the diode is made to be conductive and also the voltage across the first limiting resistor is lower than the lighting start voltage of the light source.

4. The lighting device of claim 3, wherein:
the second voltage is constant and has a value determined based on a specific forward voltage of the light source which corresponds to a specific dimming level within a lower dimming level range included in a whole of a permissible range of the dimming level.

5. The lighting device of claim 4, wherein:
the specific dimming level is a dimming level of a dimming lower limit.

6. The lighting device of claim 3, wherein:
the second voltage is constant and has a value determined based on a representative value of forward voltage of the light source, which corresponds to dimming levels within a lower dimming level range that contains a dimming lower limit and is included in a whole of a permissible range of the dimming level.

7. The lighting device of claim 3, wherein:
the reference setter is configured to store in advance dimming data showing a relationship between the dimming level and a forward voltage of the light source, and the reference setter is configured
  to, based on the dimming data, determine a forward voltage of the light source that corresponds to the dimming instruction value, and
  to determine the second voltage based on the determined forward voltage of the light source corresponding to the dimming instruction value.

8. The lighting device of claim 2, wherein:
the second voltage is constant and has a value determined based on a specific forward voltage of the light source which corresponds to a specific dimming level within a lower dimming level range included in a whole of a permissible range of the dimming level.

9. The lighting device of claim 8, wherein:
the specific dimming level is a dimming level of a dimming lower limit.

10. A luminaire comprising:
the lighting device of claim 8;
the light source, the light source including at least one solid-state light emitting element and supplied with the DC power from the lighting device; and
a casing to which the light source is attached.

11. The lighting device of claim 2, wherein:
the second voltage is constant and has a value determined based on a representative value of forward voltage of the light source, which corresponds to dimming levels within a lower dimming level range that contains a dimming lower limit and is included in a whole of a permissible range of the dimming level.

12. A luminaire comprising:
the lighting device of claim 11;
the light source, the light source including at least one solid-state light emitting element and supplied with the DC power from the lighting device; and
a casing to which the light source is attached.

13. The lighting device of claim 2, wherein:
the reference setter is configured to store in advance dimming data showing a relationship between the dimming level and a forward voltage of the light source, and the reference setter is configured
  to, based on the dimming data, determine a forward voltage of the light source that corresponds to the dimming instruction value, and
  to determine the second voltage based on the determined forward voltage of the light source corresponding to the dimming instruction value.

14. A luminaire comprising:
the lighting device of claim 13;
the light source, the light source including at least one solid-state light emitting element and supplied with the DC power from the lighting device; and
a casing to which the light source is attached.

15. A luminaire comprising:
the lighting device of claim 2;
the light source, the light source including at least one solid-state light emitting element and supplied with the DC power from the lighting device; and
a casing to which the light source is attached.

16. The lighting device of claim 1, wherein:
the second voltage is constant and has a value determined based on a specific forward voltage of the light source which corresponds to a specific dimming level within a lower dimming level range included in a whole of a permissible range of the dimming level.

17. The lighting device of claim 16, wherein:
the specific dimming level is a dimming level of a dimming lower limit.

18. The lighting device of claim 1, wherein:
the second voltage is constant and has a value determined based on a representative value of forward voltage of the light source, which corresponds to dimming levels within a lower dimming level range that contains a dimming lower limit and is included in a whole of a permissible range of the dimming level.

19. The lighting device of claim 1, wherein:
the reference setter is configured to store in advance dimming data showing a relationship between the dimming level and a forward voltage of the light source, and the reference setter is configured
to, based on the dimming data, determine a forward voltage of the light source that corresponds to the dimming instruction value, and
to determine the second voltage based on the determined forward voltage of the light source corresponding to the dimming instruction value.

20. A luminaire comprising:
the lighting device of claim 1;
the light source, the light source including at least one solid-state light emitting element and supplied with the DC power from the lighting device; and
a casing to which the light source is attached.

* * * * *